United States Patent
Halfaoui et al.

(10) Patent No.: US 12,340,595 B2
(45) Date of Patent: Jun. 24, 2025

(54) LANE DETECTION SYSTEM AND METHOD FOR A VEHICLE

(71) Applicant: Huawei Technologies Co., Ltd., Shenzhen (CN)

(72) Inventors: Ibrahim Halfaoui, Munich (DE); Fahd Bouzaraa, Munich (DE); Onay Urfalioglu, Munich (DE)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 534 days.

(21) Appl. No.: 17/681,351

(22) Filed: Feb. 25, 2022

(65) Prior Publication Data

US 2022/0180646 A1 Jun. 9, 2022

Related U.S. Application Data

(63) Continuation of application No. PCT/EP2019/077638, filed on Oct. 11, 2019.

(51) Int. Cl.
  *G06V 20/56* (2022.01)
  *G06V 10/44* (2022.01)
  *G06V 10/82* (2022.01)

(52) U.S. Cl.
  CPC .......... *G06V 20/588* (2022.01); *G06V 10/454* (2022.01); *G06V 10/82* (2022.01)

(58) Field of Classification Search
  None
  See application file for complete search history.

(56) References Cited

U.S. PATENT DOCUMENTS

2019/0095722 A1* 3/2019 Kang .................. G06V 20/588

FOREIGN PATENT DOCUMENTS

| CN | 107644197 A |   | 1/2018 |
|----|-------------|---|--------|
| CN | 109246364   | * | 10/2018 |
| EP | 2551835     | * | 1/2013 |
| JP | 2020064046  | * | 4/2020 |

(Continued)

OTHER PUBLICATIONS

Halfaoui et al.,"Real-Time Lane ID Estimation Using Recurrent Neural Networks With Dual Convention," arXiv:2001.04708v1, XP81578337, total 8 pages (Jan. 14, 2020).

(Continued)

*Primary Examiner* — Fan Zhang
(74) *Attorney, Agent, or Firm* — Leydig, Voit & Mayer, Ltd.

(57) ABSTRACT

A lane detection system or a vehicle is provided for determining a current lane of a multi-lane road, which the vehicle is driving on. The lane detection system comprises a processing circuitry configured to: obtain a current image of the multi-lane road, i.e. the driving scene; determine a first candidate current lane, i.e. a first estimate of the current lane, by using the leftmost lane in the current image as a first reference lane; determine a second candidate current lane, i.e. a second estimate of the current lane, by using the rightmost lane in the current image of the multi-lane road as a second reference lane; and determine the current lane of the vehicle in the current image of the multi-lane road on the basis of the first candidate current lane and the second candidate current lane.

20 Claims, 14 Drawing Sheets

(56) References Cited

FOREIGN PATENT DOCUMENTS

KR 101730348 * 4/2017

OTHER PUBLICATIONS

Zou et al.,"Robust Lane Detection from Continuous Driving Scenes Using Deep Neural Networks," IEEE Transactions on Vehicular Technology, XP81651004, total 14 pages (2019).
Nedevschi et al.,"3D Lane Detection System Based on Stereovision," 2004 IEEE Intelligent Transportation Systems Conference, Washington, D.C., USA, pp. 161-166 (Oct. 3-6, 2004).
Shi et al.,"Convolutional LSTM Network: A Machine Learning Approach for Precipitation Nowcasting," arXiv:1506.04214v2 [cs.CV], total 12 pages (Sep. 19, 2015).
Knoop et al.,"Lane determination with GPS Precise Point Positioning," IEEE Transactions on Intelligent Transportation Systems, vol. 18, No. 9, pp. 2503-2513 (Sep. 2017).
Aly et al.,"LaneQuest: An Accurate and Energy-Efficient Lane Detection System," 2015 IEEE International Conference on Pervasive Computing and Communications (PerCom), pp. 163-171 (2015).
Dao et al.,"Markov-Based Lane-Positioning Using Intervehicle Communication," IEEE Transactions on Intelligent Transportation Systems, vol. 8, No. 4, pp. 641-650 (Dec. 2007).
Cui et al.,"Real-Time Global Localization of Robotic Cars in Lane Level via Lane Marking Detection and Shape Registration," IEEE Transactions on Intelligent Transportation Systems, vol. 17, No. 4, pp. 1039-1050 (Apr. 2016).
Jimenez, "Intelligent Vehicles Enabling Technologies and Future Developments," Butterworth-Heinemann, Total 482 pages (Sep. 2017).
Khan et al., "A Guide to Convolutional Neural Networks for Computer Vision," Morgan & Claypool Publishers, Synthesis Lectures on Computer Vision, Total 209 pages (Feb. 2018).
Liu et al., "Creating Autonomous Vehicle Systems," Morgan & Claypool Publishers, Creating Autonomous Vehicle Systems, Total 198 pages (Oct. 2017).
Rezaei et al., "Computer Vision for Driver Assistance," Simultaneous Traffic and Driver Monitoring, Springer, Total 234 pages (Feb. 2017).

* cited by examiner

- Efficient transformation from a 1x8x256x512 (8=Num. of classes, 256=Height, 512=Width) tensor into a 1x8 scores tensor.

LANE DETECTION SYSTEM AND METHOD FOR A VEHICLE

CROSS-REFERENCE TO RELATED APPLICATIONS

This application is a continuation of International Application No. PCT/EP2019/077638, filed on Oct. 11, 2019, the disclosure of which is hereby incorporated by reference in its entirety.

TECHNICAL FIELD

Embodiments of the present disclosure relate to image processing. More specifically, embodiments of the present disclosure relate to a lane detection system and method implemented, for instance, as a component of an advanced driver assistance system for a vehicle.

BACKGROUND

Advanced driver assistance systems (ADASs), which can, for instance, alert the driver in dangerous situations or take an active part in driving, are gradually being implemented in vehicles. Such systems, which are also referred to as autonomous driving systems, are expected to grow more and more complex towards full autonomy in the future.

One challenge for autonomous driving systems is determining the lane on which the car is driving, i.e. the lane ID, as well as the total number of lanes of the road, i.e. the lane count, as this information is highly interesting for several related technologies, such as localization and mapping, safe path planning and many further tasks. In the context of mapping for instance, the lane ID and lane count represent additional valuable features which can be added and stored as an additional map feature. Similarly, the information about the lane ID and lane count increases the accuracy of the localization step. For safe path planning, an accurate determination of the number of lanes on the road is a crucial prerequisite for an accurate estimation for the safe path(s).

A known approach for accurately estimating the current driven lane has been disclosed by Heba Aly, Anas Basalamah and Moustafa Youssef "LaneQuest: An Accurate and Energy-Efficient Lane Detection System" in IEEE PerCom 2015, which relies on ubiquitous inertial sensors available in commodity smartphones to provide an accurate estimate of the car's current lane without any visual input but rather based on information about the surrounding environment of the car.

In Knoop, Victor L., et al. "Lane determination with GPS precise point positioning" IEEE Transactions on Intelligent Transportation Systems 18.9 (2017): 2503-2513 a GPS-based method known as GPS-PPP is introduced, which allows for sub-meter real-time accurate positioning of vehicles on multi-lane motorways.

Dao, Thanh-Son, et al. "Markov-based lane positioning using intervehicle communication." IEEE Transactions on Intelligent Transportation Systems 8.4 (2007): 641-650 disclose a Markov-based alternative for lane-level localization that leverages connectivity between neighbouring cars taking part in the traffic within a certain range and exchanging information to precisely locate each other.

Moreover, there have been some suggestions to harness visual cues for performing the lane-level positioning for autonomous vehicles. For instance, Cui, Dixiao, Jianru Xue, and Nanning Zheng, "Real-time global localization of robotic cars in lane level via lane marking detection and shape registration" IEEE Transactions on Intelligent Transportation Systems 17.4 (2015): 1039-1050 propose an accurate real-time positioning method for robotic cars in urban environments. This approach uses a robust lane marking detection algorithm, as well as an efficient shape registration algorithm between the detected lane markings and a GPS-based road shape prior, to improve the robustness and accuracy of the global localization of a robotic car.

In Nedevschi, Sergiu, et al. "3D lane detection system based on stereovision" Proceedings. The 7th International IEEE Conference on Intelligent Transportation Systems (IEEE Cat. No. 04TH8749). IEEE, 2004 a 3D lane detection method is introduced which is based on stereo-vision where the availability of 3D information allows the separation between the road and the obstacle features. Consequently, the lane can be modelled as a 3D surface and the prediction of its current parameters is performed based on the past information and the vehicle dynamics.

Although the conventional approaches described above, provide already some advantages there is still room for improvement. Thus, there is a need for an improved lane detection system as well as a corresponding method.

SUMMARY

It is an object of the invention to provide an improved lane detection system as well as a corresponding method.

The foregoing and other objects are achieved by the subject matter of the independent claims. Further implementation forms are apparent from the dependent claims, the description and the figures.

The following abbreviations and definitions will be used herein for describing the invention in more detail:

DNN—Deep Neural Network
CNN—Convolutional Neural Network
RNN—Recurrent Neural Network
Lane ID Lane identifier or the number of the lane the car is currently driving on Lane count Total number of lanes in the road
LSTM Long-short term memory cells responsible for gating the past information in neural networks
ConvLSTM LSTM cells able to process 2D tensors (e.g. images)
Image—A visual representation of a real world or synthetic scene by a digital camera; also referred to as picture.
Pixel—The smallest addressable picture/image element.
Scene—The surrounding environment with respect to a reference, for instance, the scene of a camera is the part of the environment which is visible from the camera.
Semantic Segmentation—A method to segment in image into different regions according to a semantic belonging. For instance, pixels depicting a car are all in red color, pixels depicting the road are all in blue color, and the like.
Machine Learning—Field of research which focuses on analyzing and learning from input data for the purpose of building a model capable of making predictions.
Deep Learning—Field of research as part of machine learning when the models are neural networks with very deep architecture and a high cardinality set of parameters.
Artificial Neural Network—A machine learning subfield in the context of deep learning, motivated by biological neural networks. Artificial networks aim at estimating functions with large number of inputs, by adaptively learning a set of connection weights.
Convolution—Mathematical operation which computes the amount of overlap of 2 functions, one of them being reversed and shifted, using integral computation.

Convolutional Neural Network—An artificial neural network which contains at least one convolutional layer in its architecture.

Autonomous driving—When the driving task is realized partly to a certain level or fully by the vehicle itself without human driver interference.

Convention—Left or right convention correspond to the side of the road where the lane counting operation starts. From left to right is the "left convention" and from right to left is the "right convention".

Confidence value—A scalar value between 0 and 1 which represent how confident the model is about the correctness of the estimate (1 means very confident, 0 not confident at all).

Generally, embodiments of the invention are directed to a deep learning-based end-to-end approach for estimating the lane ID as well as the lane count. Embodiments of the invention are based on a visual representation of the driving scene (image) and make use of the temporal dimension by deploying LSTMs cells in the convolutional neural network. Embodiments of the invention offer the possibility to know which lane the car is driving on, especially in extreme cases with not enough visual content. Embodiments of the invention are based on the idea to approach the task from two different point of views, namely the left and the right side of the road, and to leverage additional information to improve the estimation using the most reliable side with more visual information and better features for estimating the current lane.

More specifically, according to a first aspect the invention relates to a lane detection system for a vehicle for determining a current lane of a multi-lane road, which the vehicle is driving on. The lane detection system comprises a processing circuitry configured to: obtain a current image of the multi-lane road, i.e. the driving scene; determine a first candidate current lane, i.e. a first estimate of the current lane, by using the leftmost lane in the current image as a first reference lane; determine a second candidate current lane, i.e. a second estimate of the current lane, by using the rightmost lane in the current image of the multi-lane road as a second reference lane; and determine the current lane of the vehicle in the current image of the multi-lane road on the basis of the first candidate current lane and the second candidate current lane.

Advantageously, the lane detection system according to the first aspect provides a holistic approach which takes into account all the available visual features/clues in the input image by relying on a first lane ID estimate based on the leftmost lane and a second lane ID estimate based on the rightmost lane of the multi-lane road the vehicle is driving on. This more robust approach allows dealing with challenging situations such as occlusions due to nearby driving cars/trucks, varying weather conditions, day or night scenes, varying illumination conditions, highway or city scenes and several additional scenarios which have an impact of the accuracy of the approach.

In a further possible implementation form of the first aspect, the processing circuitry is further configured to determine the total number of lanes of the multi-lane road on the basis of the current image of the multi-lane road.

In a further possible implementation form of the first aspect, the processing circuitry is configured to determine the first candidate current lane as a first set of likelihood measure values, e.g. a first likelihood vector, and the second candidate current lane as a second set of likelihood measure values, e.g. a second likelihood vector, wherein the first set of likelihood measure values comprises a respective likelihood measure value for each lane of the multi-lane road that the car is driving on the respective lane and wherein the second set of likelihood measure values comprises a respective likelihood measure value for each lane of the multi-lane road that the car is driving on the respective lane.

In a further possible implementation form of the first aspect, the processing circuitry for determining the current lane of the vehicle in the current image of the multi-lane road on the basis of the first candidate current lane and the second candidate current lane is configured to: determine the first candidate current lane as the lane associated with the largest likelihood measure value of the first set of likelihood measure values; determine the second candidate current lane as the lane associated with the largest likelihood measure value of the second set of likelihood measure values; and determine either the first candidate current lane or the second candidate current lane to be the current lane of the vehicle in the current image by comparing the difference between the largest likelihood measure value and the average likelihood measure value of the first set of likelihood measure values with the difference between the largest likelihood measure value and the average likelihood measure value of the first set of likelihood measure values.

In a further possible implementation form of the first aspect, the processing circuitry is configured to obtain a plurality of temporally successive images of the multi-lane road, including the current image and one or more previous images, and wherein the processing circuitry is configured to determine the current lane of the vehicle in the current image of the multi-lane road on the basis of the first candidate current lane, the second candidate current lane and one or more previously determined lanes of the vehicle in the one or more previous images of the multi-lane road.

In a further possible implementation form of the first aspect, the processing circuitry is further configured to determine whether the vehicle is moving or not and, if the vehicle is not moving, to determine the current lane of the vehicle in the current image of the multi-lane road on the basis of one or more previously determined lanes of the vehicle in the one or more previous images.

In a further possible implementation form of the first aspect, the processing circuitry is configured to determine whether the vehicle is moving or not on the basis of the one or more previously determined lanes of the vehicle in the one or more previous images.

In a further possible implementation form of the first aspect, the processing circuitry is configured to implement a convolutional neural network configured to determine the first candidate current lane, the second candidate current lane and the current lane using one or more convolutional neural network weights. In an implementation form, the convolutional neural network comprises one or more LSTM cells.

In a further possible implementation form of the first aspect, the neural network is configured to train the convolutional neural network weights using a cost function, wherein the cost function is based on a cross entropy loss function, wherein the cost function further depends on the distance of a lane from the leftmost lane and/or the rightmost lane in the current image of the multi-lane road and/or wherein the cost function implements a constraint that the first candidate current lane and the second candidate current lane are related to the total number of lanes of the multi-lane road.

In a further possible implementation form of the first aspect, the processing circuitry is further configured to implement a semantic segmentation network, wherein the semantic segmentation network is configured to semantically segment the current image of the multi-lane road and wherein the processing circuitry is configured to determine the current lane of the vehicle in the current image of the multi-lane road on the basis of the first candidate current lane, the second candidate current lane and the semantically segmented current image.

In a further possible implementation form of the first aspect, the processing circuitry is further configured to generate a first confidence value for the first candidate current lane and a second confidence value for the second candidate current lane.

In a further possible implementation form of the first aspect, the processing circuitry is configured to: flip the image of the multi-lane road along a vertical axis to obtain a flipped image of the multi-lane road; determine a third candidate current lane, i.e. a third estimate of the current lane, by using the leftmost lane in the flipped image of the multi-lane road as the first reference lane; determine a fourth candidate current lane, i.e. a fourth estimate of the current lane, by using the rightmost lane in the flipped image of the multi-lane road as the second reference lane; and determine the current lane of the vehicle on the basis of the first candidate current lane and the second candidate current lane and the constraint that the first candidate current lane is equal to the fourth candidate current lane and the second candidate current lane is equal to the third candidate current lane.

In a further possible implementation form of the first aspect, the processing circuitry is configured to obtain a plurality of temporally successive images of the multi-lane road, including the current image, wherein the processing circuitry is configured to adjust the brightness of the current image on the basis of an average brightness of the plurality of temporally successive images of the multi-lane road.

In a further possible implementation form of the first aspect, the lane detection system further comprises a camera configured to capture the image of the multi-lane road.

According to a second aspect the invention relates to a vehicle comprising a lane detection system according to the first aspect of the invention.

According to a third aspect the invention relates to a method of determining a current lane of a multi-lane road a vehicle is driving on, wherein the method comprises the steps of:
  obtaining a current image of the multi-lane road, i.e. the driving scene;
  determining a first candidate current lane, i.e. a first estimate of the current lane, by using the leftmost lane in the current image of the multi-lane road as a first reference lane;
  determining a second candidate current lane, i.e. a second estimate of the current lane, by using the rightmost lane in the current image of the multi-lane road as a second reference lane; and determining the current lane of the vehicle in the current image of the multi-lane road on the basis of the first candidate current lane and the second candidate current lane.

The lane detection method according to the third aspect of the invention can be performed by the lane detection system according to the first aspect of the invention. Further features of the lane detection method according to the third aspect of the invention result directly from the functionality of the lane detection system according to the first aspect of the invention and its different implementation forms described above and below.

According to a fourth aspect, the invention relates to a computer program product comprising a non-transitory computer-readable storage medium carrying program code which causes a computer or a processor to perform the lane detection method according to the third aspect when the program code is executed by the computer or the processor.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which.

Figure 1:
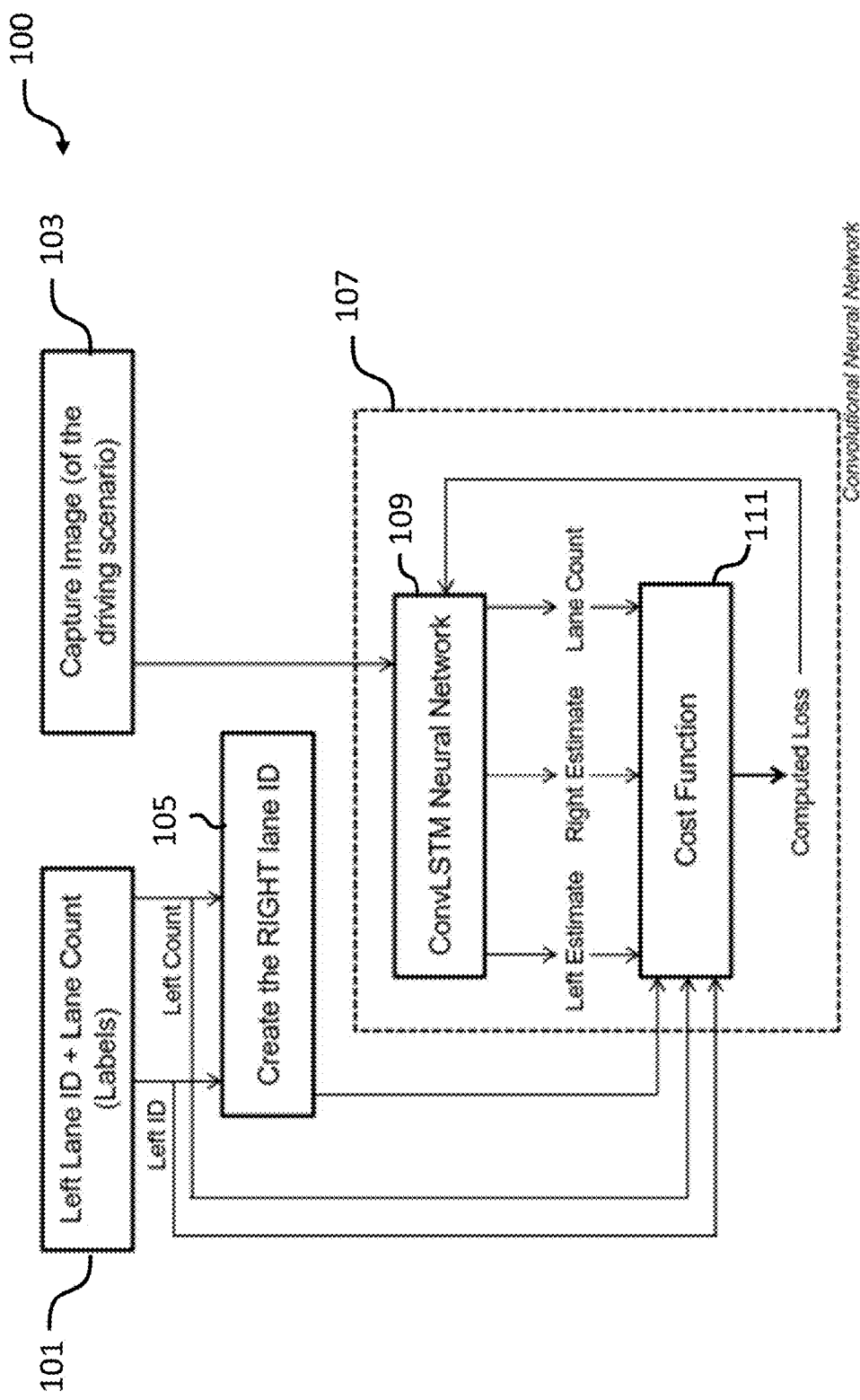
FIG. 1 is a schematic diagram illustrating processing blocks implemented in a training phase by a lane detection system for a vehicle according to an embodiment of the invention.

In the following identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Under reference to the figures, in the following embodiments of a lane detection system 100 of a vehicle for determining the current lane of a multi-lane road, which the vehicle is driving on, will be described in more detail. The lane detection system 100 could be part of an advanced driver assistance system (ADAS) implemented in the vehicle.

Generally and as will be described in more detail below, the lane detection system 100 comprises a processing circuitry configured to: obtain a current image of the multi-lane road, i.e. the driving scene; determine a first candidate current lane, i.e. a first estimate of the current lane, by using the leftmost lane in the current image as a first reference lane; determine a second candidate current lane, i.e. a second estimate of the current lane, by using the rightmost lane in the current image of the multi-lane road as a second reference lane; and determine the current lane of the vehicle in the current image of the multi-lane road on the basis of the first candidate current lane and the second candidate current lane. The processing circuitry may comprise hardware and software. The hardware may comprise digital circuitry, or both analog and digital circuitry. Digital circuitry may comprise components such as application-specific integrated circuits (ASICs), field-programmable arrays (FPGAs), digital signal processors (DSPs), or general-purpose processors. In one embodiment, the processing circuitry comprises one or more processors and a non-transitory memory connected to the one or more processors. The non-transitory memory may carry executable program code which, when executed by the one or more processors, causes the apparatus to perform the operations or methods described herein.

Figure 8:
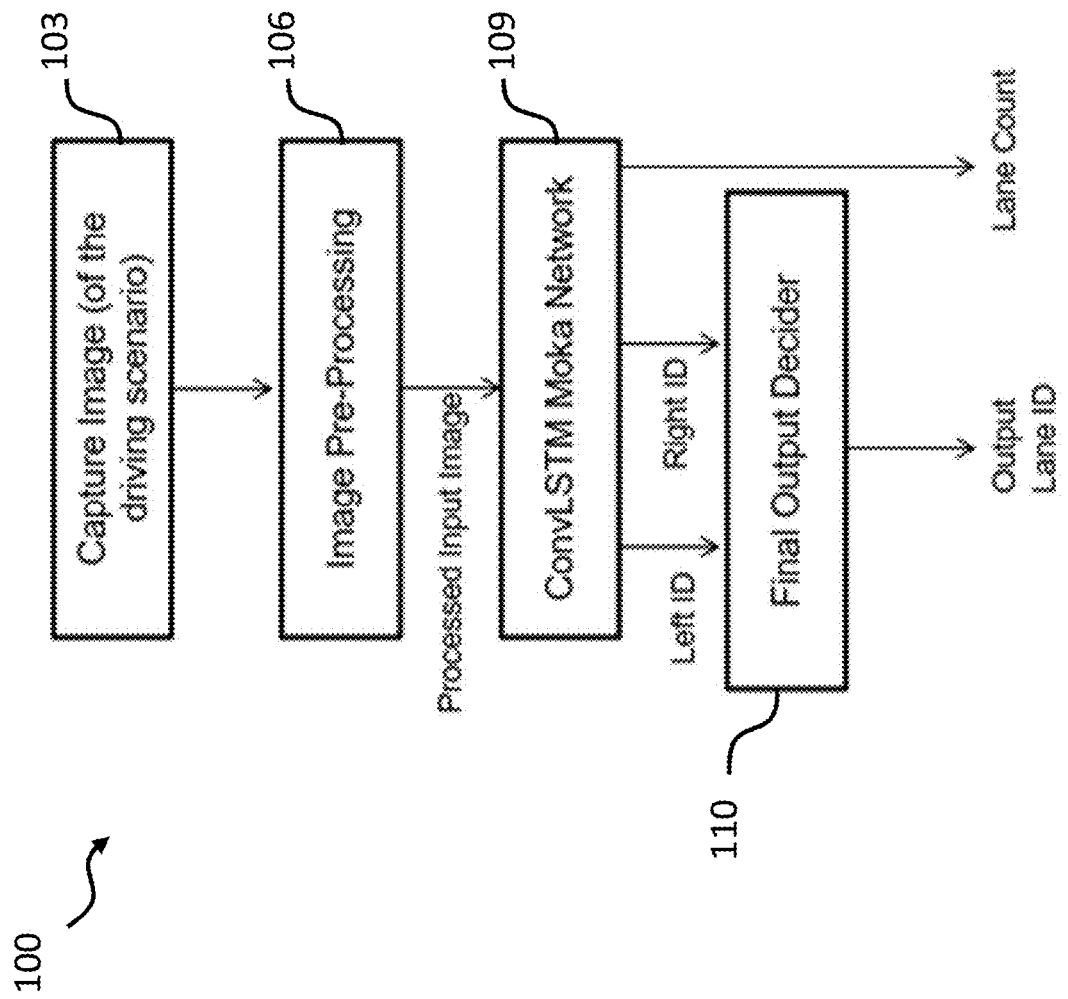
FIG. 8 is a schematic diagram illustrating processing blocks implemented in an application phase by a lane detection system for a vehicle according to an embodiment of the invention.
Figure 10:
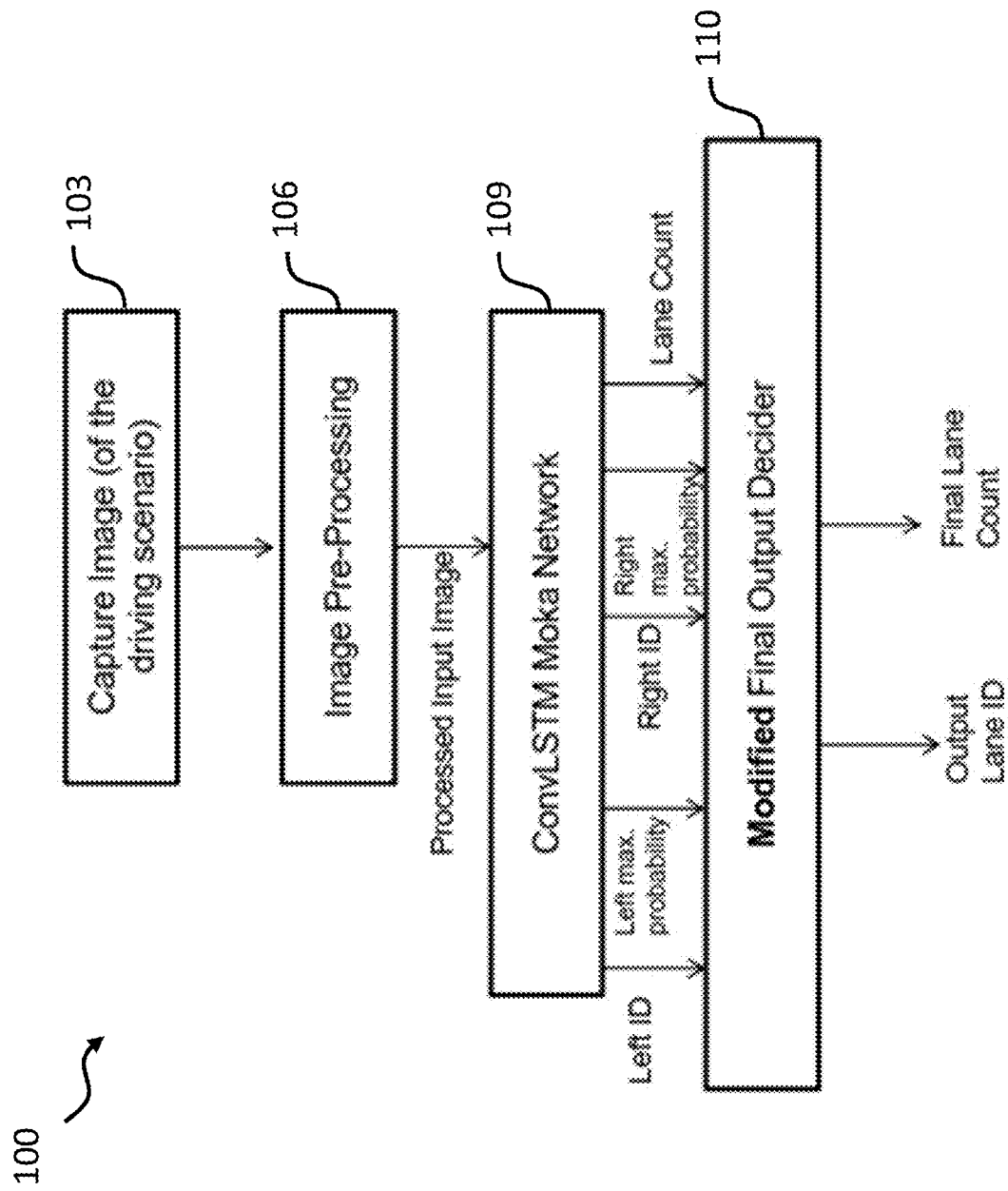
FIG. 10 is a schematic diagram illustrating processing blocks implemented in an application phase by a lane detection system for a vehicle according to an embodiment of the invention.

In an embodiment, the processing circuitry of the lane detection system 100 is configured to implement a convolutional neural network 109, 110 configured to determine the first candidate current lane, the second candidate current lane and the current lane using one or more convolutional neural network weights. FIG. 1 shows processing blocks implemented by the processing circuitry of the lane detection system 100 during a training phase of the convolutional neural network 107, 109 according to an embodiment, while FIGS. 8 and 10 show processing blocks implemented by the processing circuitry of the lane detection system 100 during an application or inference phase of the convolutional neural network 109 according to different embodiments.

In processing block 103 of FIG. 1, the processing circuitry of the lane detection system 100 is configured to obtain or capture the visual representation of the driving scene. To this end, in an embodiment, the lane detection system 100 can comprise or be connected to a camera implemented in the vehicle and configured to capture the image of the multi-lane road, i.e. the driving scene. Together with the input image obtained in processing block 103 of FIG. 1, ground-truth labels of the correct lane ID, i.e. the current lane number, and lane count are obtained by the processing circuitry of the lane detection system 100 in processing block 101 of FIG. 1. By way of example, in the processing block 101 shown in FIG. 1 the correct left ID is obtained by starting to count from the leftmost lane of the multi-lane road, which using this "left convention" is lane number 1. As will be appreciated, however, processing block 101 likewise could obtain the correct right ID, which is based on the rightmost lane of the multi-lane road.

Figure 2:
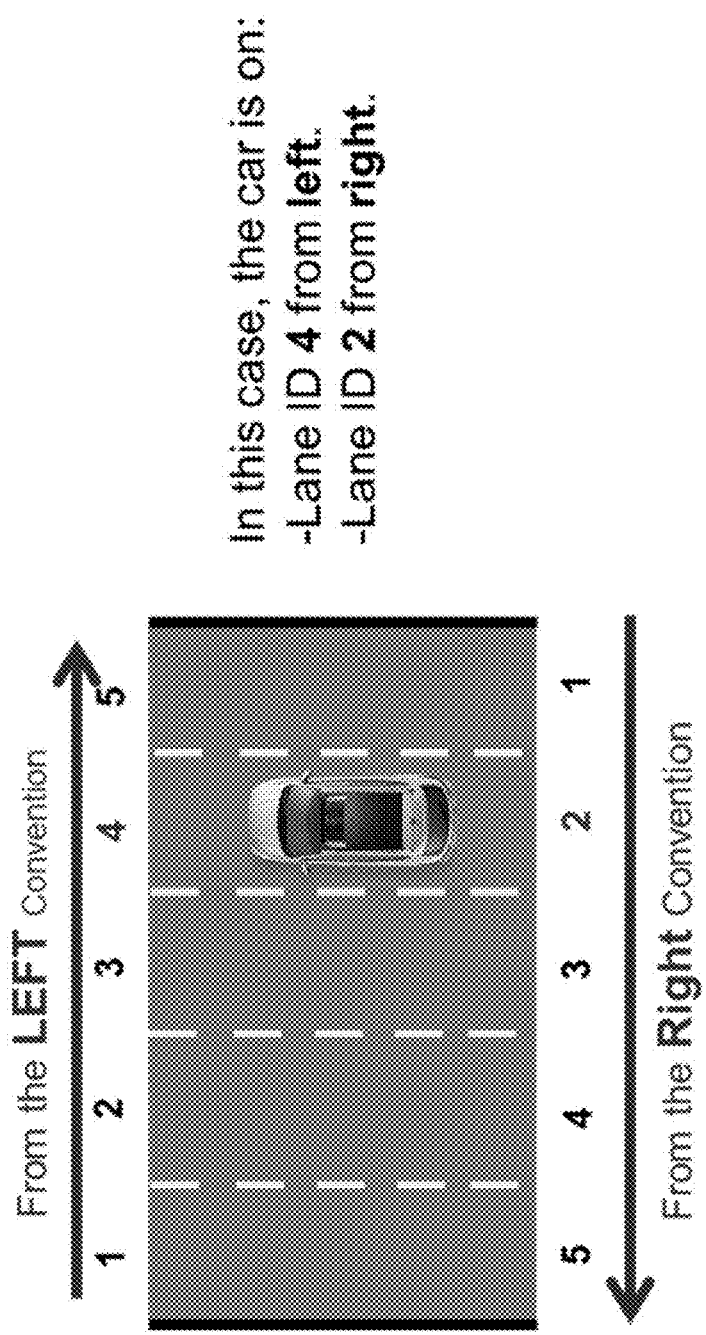
FIG. 2 is a schematic diagram illustrating different aspects implemented in a lane detection system according to an embodiment of the invention.

The "left convention" and "right invention" as used herein are illustrated by an example shown in FIG. 2. In this example, the multi-lane road has 5 lines, wherein the car is currently driving on lane number 4 according to the "left convention" (i.e. the left lane ID) and on lane number 2 according to the "right convention" (i.e. the right lane ID). As will be appreciated, there is a simple relation between the left lane ID, the right lane ID and the total number of lanes of the multi-lane road. This relation is used in processing block 105 of FIG. 1 for determining the right lane ID on the basis of the left lane ID and the lane count, i.e. the total number of lanes, provided by processing block 101.

The training input image of the driving scenario obtained in processing block 103 of FIG. 1 is provided to the convolutional neural network 109 in order to estimate the left lane ID (lane counting starts from the leftmost lane of the road), the right lane ID (lane counting starts from the rightmost lane of the road) and the total lane count. According to an embodiment, the processing block 103 can be configured to use sequences of images extracted from videos of driving cars. However, according to an embodiment during each forward pass, only a single image is processed.

Figure 3:
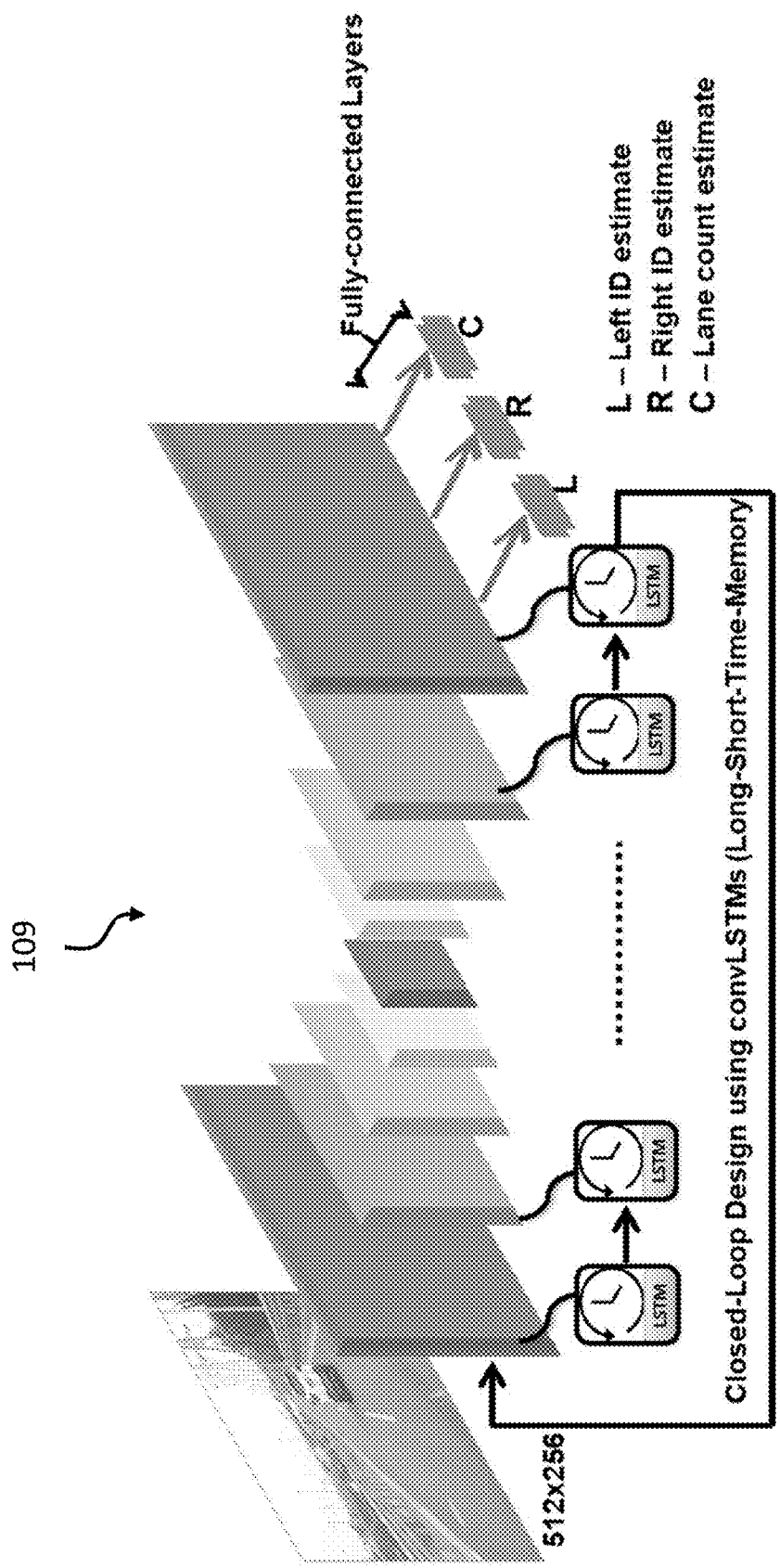
FIG. 3 is a schematic diagram illustrating the architecture of a neural network implemented by a lane detection system for a vehicle according to an embodiment of the invention.

FIG. 3 illustrates an embodiment of the architecture of the neural network 109 implemented by the processing circuitry of the lane detection system 100. In the exemplary embodiment shown in FIG. 3, the neural network 109 is based on a "Moka" style architecture. As will be appreciated, the Moka architecture is composed of an encoder part which gradually extracts high level features by down-sampling the image/feature maps, together with a decoder part which enables the recovery of the full resolution. Furthermore, the architecture can be designed in such a way that corresponding parts from the encoder and the decoder are joined together using long-range links. Finally, in the exemplary architecture shown in FIG. 3, three fully connected blocks can be linked to the network in order to generate the required three scalars corresponding to the left/right lane ID estimates and the lane count estimate. According to an embodiment, the neural network 109 is equipped with Convolutional LSTMs (ConvLSTM) cells at each resolution. These cells enable the capturing of the temporal dimension inherent to the sequence of the input images. Further details concerning Convolutional LSTMs (convLSTM) are disclosed, for instance, in Xingjian Shi, Zhourong Chen, Hao Wang, Dit-Yan Yeung, Wai-kin Wong, Wang-chun Woo, "Convolutional LSTM Network: A Machine Learning Approach for Precipitation Nowcasting" Advances in neural information processing systems, 802-810. IEEE, 2015, which is fully incorporated herein by reference.

Figure 4:
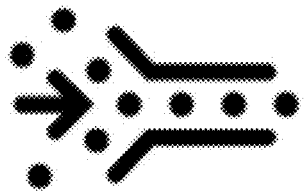
FIG. 4 is a schematic diagram illustrating different aspects implemented in a lane detection system according to an embodiment of the invention.
Figure 4:
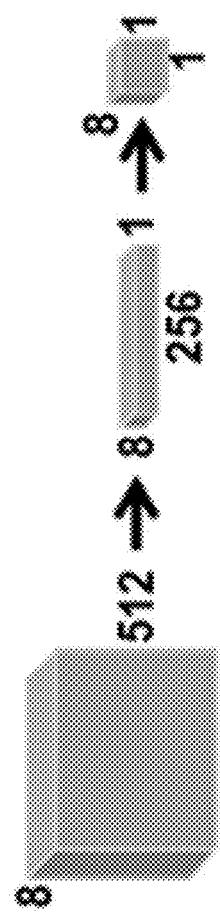

According to an embodiment, the neural network 109 is configured to compress a 1×Num_Classes×Height×Width tensor into a 1×Num_Classes vector, as illustrated in FIG. 4. This provides a smooth transition from the last convolutional layer to the fully connected block of the exemplary neural network architecture shown in FIG. 3.

Referring back to FIG. 1, in processing block 111 thereof the estimated left/right lane IDs and lane count provided by the neural network 109 are compared with the ground truth left/right IDs and lane count provided by processing blocks 101 and 105 using an adequately designed cost function 111. The comparison yields a "loss" term which is fed back to the neural network 109 in order to adapt the corresponding weights and biases via backpropagation.

In an embodiment, the cost function 111 is based on a conventional cross entropy loss function.

In an embodiment, the cost function 111 can further depend on the distance of a lane from the leftmost lane and/or the rightmost lane in the current image of the multi-lane road. This adaptive penalty term gives more weight to the estimate of the right estimate and left estimate being the smallest such that the network 109 learns to update its weights and biases based (partly) on the smallest output which is likely to be more accurate.

In an embodiment, the cost function 111 implements a constraint that the first candidate current lane and the second candidate current lane are related to the total number of lanes of the multi-lane road. This constraint can be expressed as a triangular regularization term enforcing the following relationship:

$$L+R=C,$$

wherein L denotes the left lane ID, R denotes the right lane ID and C denotes the total lane count. In this way, the three outputs of the neutral network 109, namely the left lane ID, the right lane ID and the lane count are linearly dependent.

In an embodiment, the cost function 111 can be a sum of all of the above terms, i.e. a sum of the cross-entropy term, the adaptive penalty term and the triangular regularization term.

Figure 5:
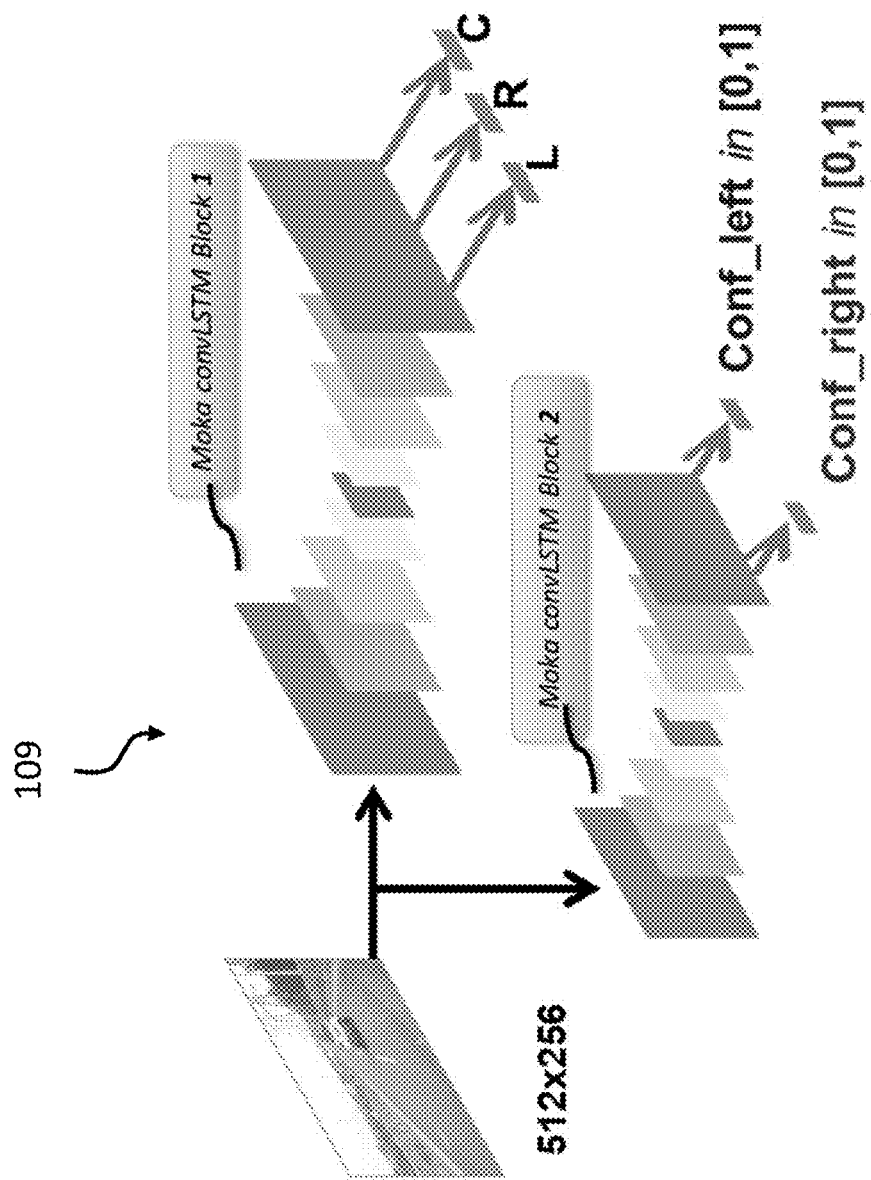
FIG. 5 is a schematic diagram illustrating the architecture of a neural network implemented by a lane detection system for a vehicle according to an embodiment of the invention.

According to a further embodiment, the processing circuitry of the lane detection system 100, in particular the neural network 109 implemented thereby, is configured to generate a first confidence value for the left lane ID, i.e. the first candidate current lane, and a second confidence value for the right lane ID, i.e. the second candidate current lane. Such an embodiment is illustrated in FIG. 5, where together with the output estimates for left and right IDs and the lane count, the neural network 109 generates additionally a confidence value between 0 and 1 for each estimate describing how reliable it is, wherein a confidence value of 0 means the estimate is expected to be wrong and a confidence value of 1 means that the network 109 is 100% confident that the estimate is correct.

Figure 6:
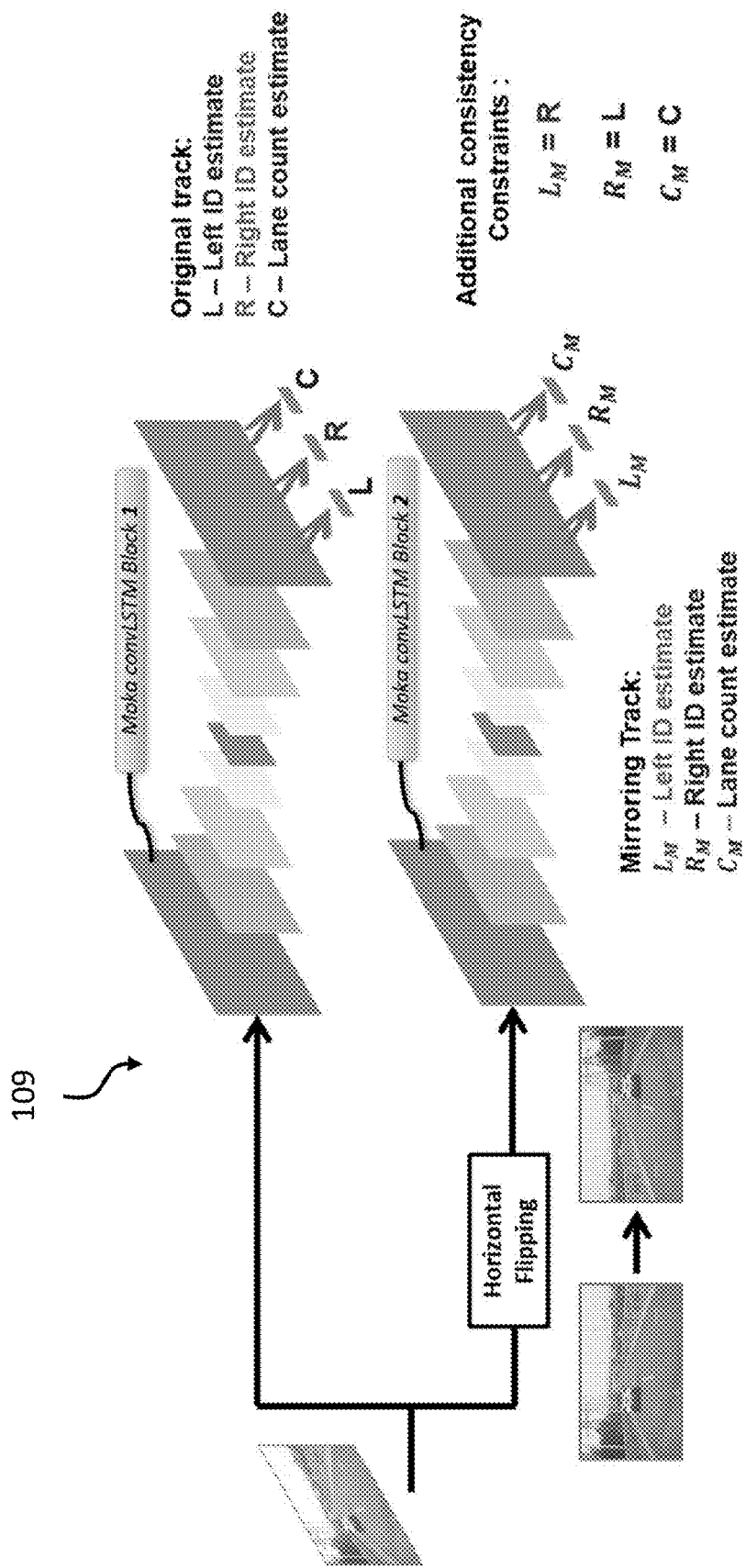
FIG. 6 is a schematic diagram illustrating the architecture of a neural network implemented by a lane detection system for a vehicle according to an embodiment of the invention.

According to a further embodiment, the processing circuitry of the lane detection system 100 is configured to: flip, i.e. mirror the image of the multi-lane road along a vertical axis to obtain a flipped, i.e. mirrored image of the multi-lane road; determine a third candidate current lane, i.e. a third estimate of the current lane, by using the leftmost lane in the flipped image of the multi-lane road as the first reference lane; determine a fourth candidate current lane, i.e. a fourth estimate of the current lane, by using the rightmost lane in the flipped image of the multi-lane road as the second reference lane; and determine the current lane of the vehicle on the basis of the first candidate current lane and the second candidate current lane and the constraint that the first candidate current lane is equal to the fourth candidate current lane and the second candidate current lane is equal to the third candidate current lane. Such an embodiment is illustrated in FIG. 6, which is based on the idea to let the neural network 109 process the mirrored image for obtaining three additional outputs using the constraints that the left lane ID of the original image is equal to the right lane ID of the mirrored image, the right lane ID of the original image is equal to the left lane ID of the mirrored image and the lane counts for both images are equal. As will be appreciated, this enforced estimation redundancy increases the overall accuracy of the original model.

According to a further embodiment illustrated in 7, the processing circuitry of the lane detection system 100 is configured to implement a semantic segmentation network 116, wherein the semantic segmentation network 116 is configured to semantically segment the current image of the multi-lane road and wherein the neural network 109 is configured to determine the current lane of the vehicle in the current image of the multi-lane road on the basis of the left lane ID, i.e. the first candidate current lane, the right lane ID, i.e. the second candidate current lane, and the semantically segmented current image. By understanding the semantic content of the current image this embodiment allows to improve the accuracy of the estimates thanks to an improved detection of semantically relevant objects such as road, cars, lane markings and the like. According to an embodiment, the semantic segmentation network 116 can either be pre-trained or trained simultaneously with the original model 109.

As already described above, FIGS. 8 and 10 show processing blocks implemented by the processing circuitry of the lane detection system 100 during an application or inference phase of the convolutional neural network 109 according to different embodiments. As will be appreciated, FIGS. 8 and 10 comprise several of the processing blocks shown in and already described in the context of FIG. 1. For instance, both FIG. 8 and FIG. 10 contain the processing block 103 configured to obtain a visual representation, i.e. image of the current driving scene. According to an embodiment, the image(s) used in this inference phase (as well as in the training phase described in the context of FIG. 1) can be grayscale images or color, e.g. RGB images. According to an embodiment, the resolution of the input image used in the inference phase can depend on the resolution selected in the training phase.

In processing block 106 of FIGS. 8 and 10, a preprocessing step can be applied to the input image provided by processing block 103. In an embodiment the pre-processing step 106 comprises a brightness adjustment based on the following considerations. During the inference phase, the average perceived brightness of the images from the given driving sequence is determined. If the perceived brightness of the current image is below the average brightness (according to a specific threshold, which can be empirically found) then an adjustment of the brightness of the image at hand can be realized. The brightness adjustment can be achieved via a linear transformation of the pixel intensities or using gamma correction. According to a further option, a new layer can be additionally considered for the neural network 109 in order to learn the optimal parameter to be used for the gamma correction.

As illustrated in FIGS. 8 and 10, the pre-processed image is provided by the processing block 106 to the neural network 109 for determining the first candidate current lane, i.e. the left lane ID, by using the leftmost lane in the current image of the multi-lane road as a first reference lane and the second candidate current lane, i.e. the right lane ID, by using the rightmost lane in the current image of the multi-lane road as a second reference lane.

Figure 7:
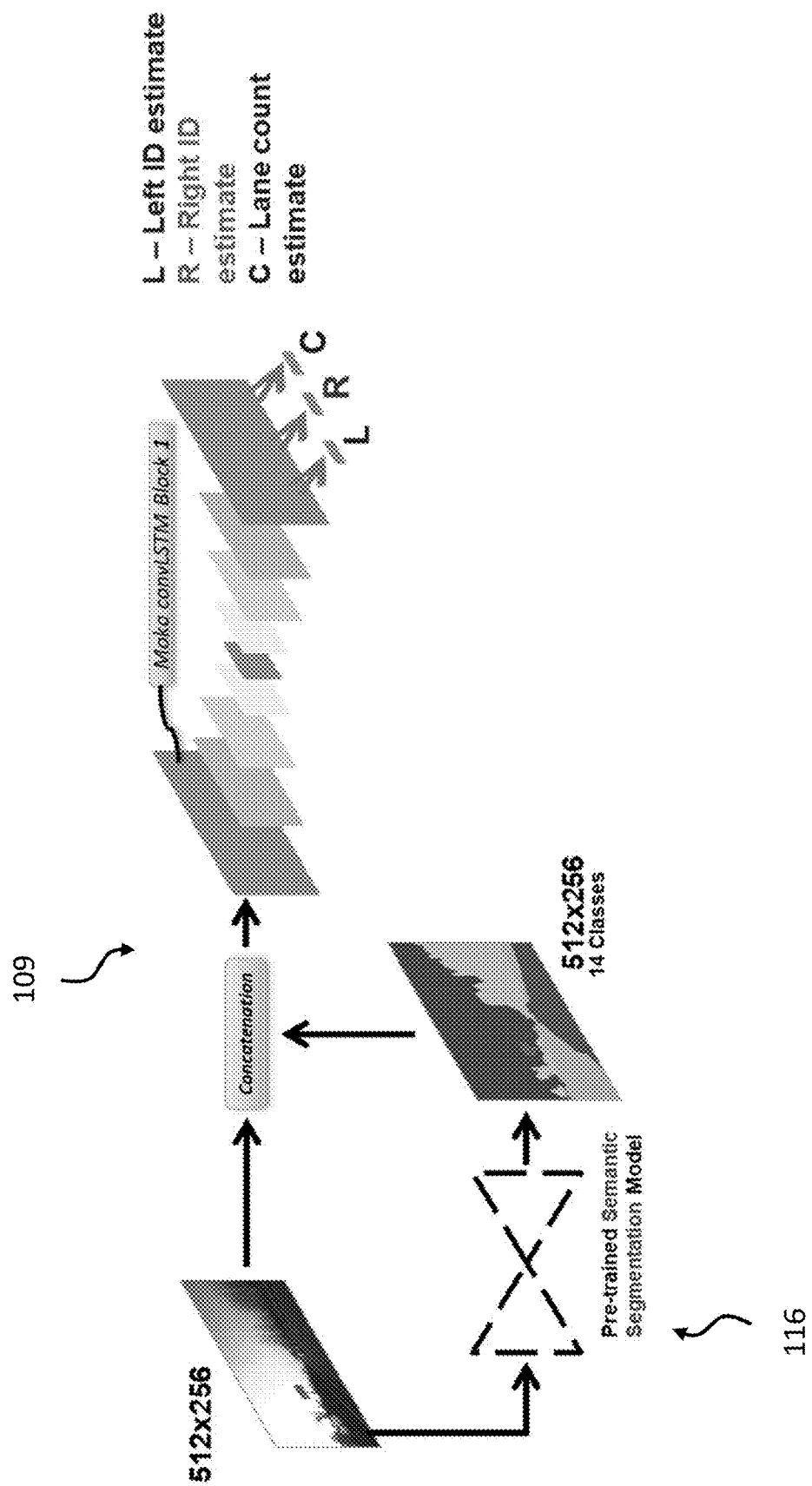
FIG. 7 is a schematic diagram illustrating the architecture of a neural network implemented by a lane detection system for a vehicle according to an embodiment of the invention.

In case the training was carried out using one of the alternative neural network architectures shown in FIGS. 6 and 7, the input setup can be adapted accordingly. For the neural network architecture shown in FIG. 6, the processed image is forwarded to a mirroring processing step, which creates a flipped version (along the vertical axis) of the input processed image. Accordingly, the input processed image is presented to the first network component ("Moka ConvLSTM Block 1" in FIG. 6) and its flipped version is forwarded to the second network component ("Moka ConvLSTM Block 2" in FIG. 6).

For the neural network architecture shown in FIG. 7, a pixel-level image segmentation is performed on the input processed image prior to the lane ID/count estimation. The segmentation result is presented together with the input processed image as a concatenated tensor to the network ("Moka ConvLSTM Block 1" in FIG. 7).

Processing block 110 of FIG. 8 (referred to as "Final Output Decider") is configured to determine the current lane of the vehicle in the current image of the multi-lane road on the basis of the first candidate current lane, i.e. the left lane ID, and the second candidate current lane, i.e. the right lane ID, as provided by the neural network 109. In an embodiment, the processing block 110 is configured to decide whether to take the left lane ID or the right lane ID as the final output, i.e. the current lane. In an embodiment, the decision to be made by the processing block 110 is defined as an entropy-based decision, as will be described in the following under further reference to FIG. 9.

Figure 9:
FIG. 9 is a schematic diagram illustrating different aspects implemented in a lane detection system according to an embodiment of the invention.

As illustrated in FIG. 9, according to an embodiment the neural network 109 implemented by the processing circuitry of the lane detection system 100 is configured to determine the first candidate current lane as a first set of likelihood measure values, i.e. a first likelihood vector (referred to as "Left Output Vector" in FIG. 9), and the second candidate current lane as a second set of likelihood measure values, i.e. a second likelihood vector (referred to as "Right Output Vector" in FIG. 9), wherein the first set of likelihood measure values comprises a respective likelihood measure value for each lane of the multi-lane road that the car is driving on the respective lane and wherein the second set of likelihood measure values comprises a respective likelihood measure value for each lane of the multi-lane road that the car is driving on the respective lane.

According to the embodiment illustrated in FIG. 9, the processing block 110 is configured to make the entropy-based decision by: determining the first candidate current lane, i.e. the left lane ID, as the lane associated with the largest likelihood measure value of the first set of likelihood measure values; determine the second candidate current lane, i.e. the right lane ID, as the lane associated with the largest likelihood measure value of the second set of likelihood measure values; and determine either the first candidate current lane, i.e. the left lane ID, or the second candidate current lane, i.e. the right lane ID, to be the current lane of the vehicle in the current image by comparing the difference between the largest likelihood measure value and the average likelihood measure value of the first set of likelihood measure values with the difference between the largest likelihood measure value and the average likelihood measure value of the first set of likelihood measure values. In other words, considering the output vector for each lane ID estimate the processing block 110 is configured to select the maximum activation values from left and right estimated vectors. The mean activation value of the corresponding vector is then subtracted from these maximum values. The decision about the final output lane ID is based on the comparison of these resulting values. The ID with the higher value is adopted as the final estimate, i.e. the current lane.

The embodiment shown in FIG. 10 differs from the embodiment shown in FIG. 8 primarily in that an additional penalizing term for fluctuations between consecutive estimates for temporally adjacent input images is implemented, which allows enforcing a smooth estimation of consecutive IDs. According to an embodiment, this is achieved by weighting all computed entropy values previously discussed to absolve the decision by the term P calculated as:

$$P = \frac{1}{1 + |L_n - L_{n-1}|}$$

Figure 11:
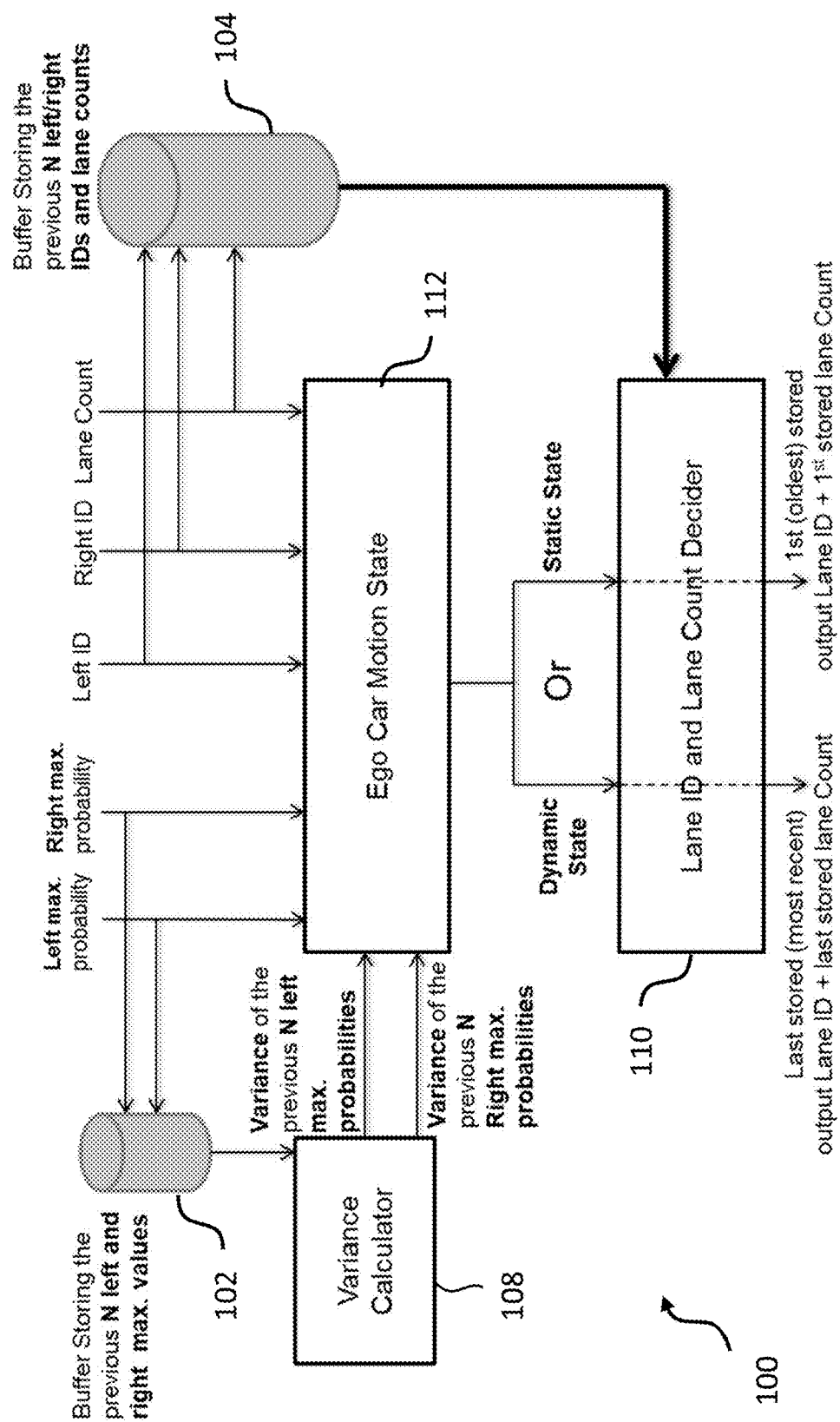
FIG. 11 is a schematic diagram illustrating different aspects implemented in a lane detection system according to an embodiment of the invention.

According to a further embodiment, the lane detection system 100 is configured to take into account the motion state of the vehicle, for instance, if the vehicle is stopping due to a traffic congestion, which could happen, for instance, due to traffic lights or spontaneous jams. To this end, the processing circuitry of the lane detection system 100 shown in FIG. 10 implements a modified processing block 110 (referred to as "Modified Final Output Decider" in FIG. 10), which for its decision takes into account the motion state of the vehicle, i.e. whether the car is moving (dynamic state) or standing still (static state). More details about the modified processing block 110 can be taken from FIG. 11. If the motion state is "dynamic" (as provided by processing block 112 of FIG. 11), the final lane ID is selected as described above. Similarly, the final estimate for the lane count corresponds to the value estimated by the network. If the motion state is "static", the final lane ID and the lane count are read from a buffer 104. This buffer 104 contains the decision for a certain number N of previous dynamic frames (this means that in case of static state, the buffer is not updated).

Figure 12:
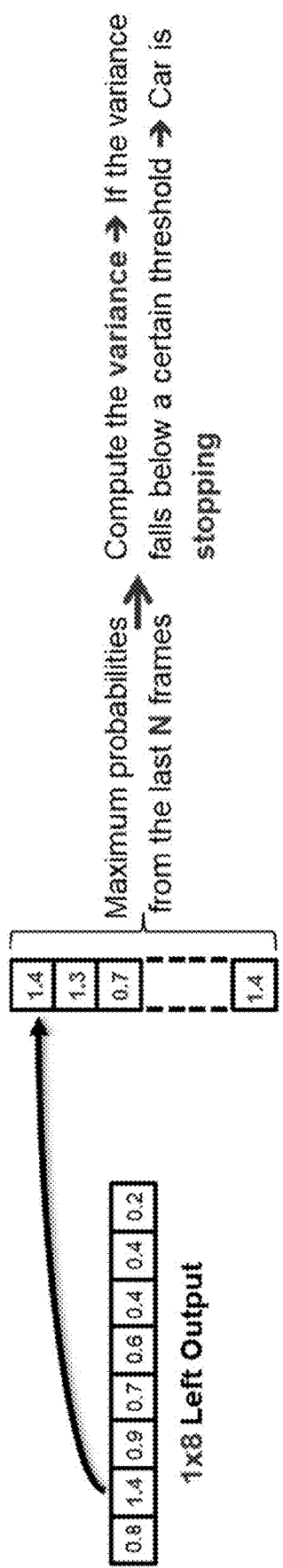
FIG. 12 is a schematic diagram illustrating different aspects implemented in a lane detection system according to an embodiment of the invention.
Figure 13B:
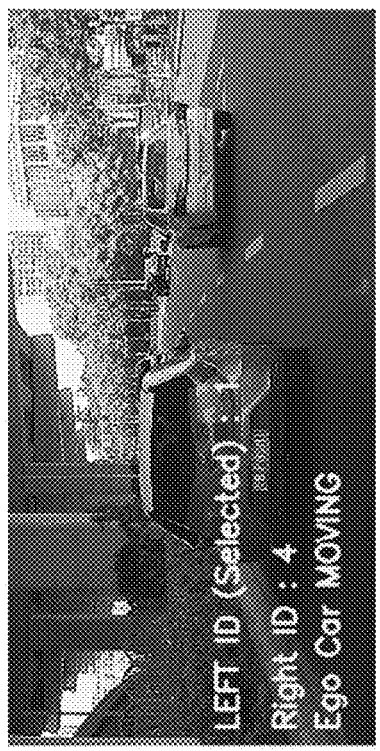
FIGS. 13a-d show exemplary images of a multi-lane road as well as lane estimates provided a lane detection system according to an embodiment of the invention.
Figure 13D:
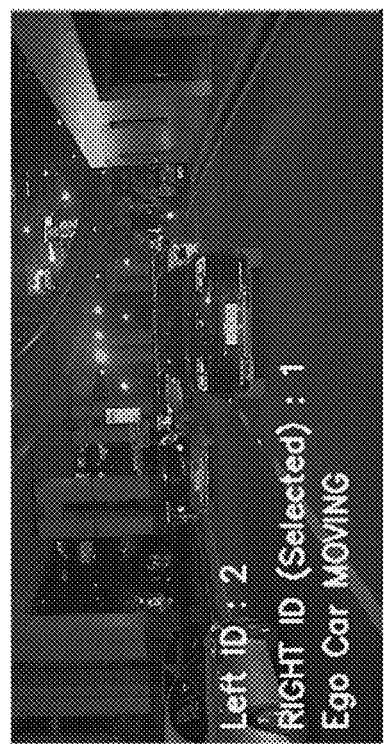
Figure 13A:
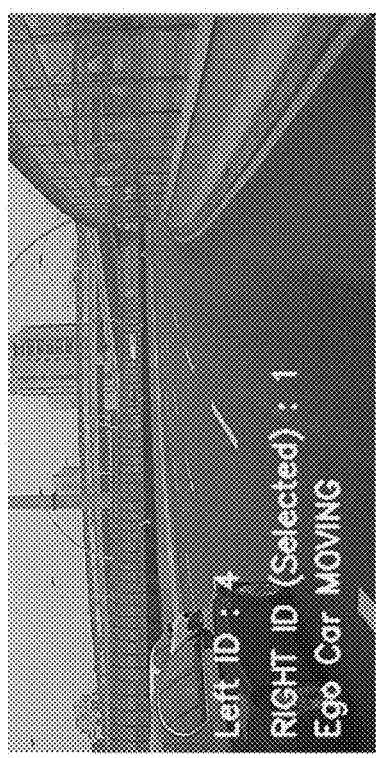
Figure 13C:
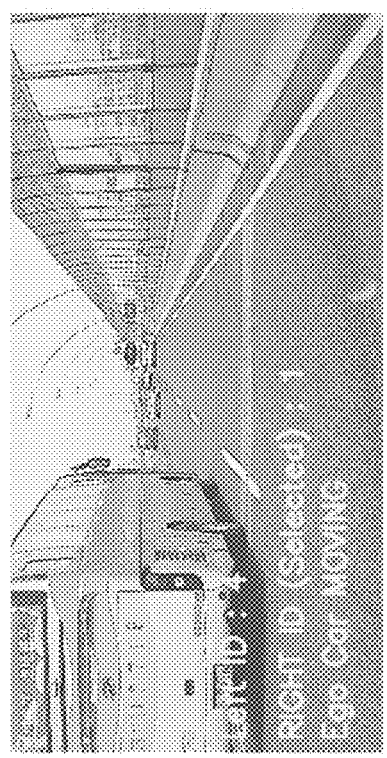

When the vehicle (referred to as ego car in FIG. 11) stops at a traffic light or in a traffic jam, the estimates provided by the neural network 109 might become less accurate due to the limited space of features the model 109 is able to extract from the current image. In order to deal with such situations, the cases where the car stops can be detected according to an embodiment. This is done using processing block 108 of FIG. 11 by tracking the variance of the left and/or right outputs over the previous N frames/images stored in another buffer 102. When the vehicle stops, the variance of the entropy values of the last N images also drops due to the similarity of the scene content in these N frames. This is illustrated in FIG. 12.

Thus, according to an embodiment the processing circuitry of the lane detection system 100 is configured to obtain a plurality of temporally successive images of the multi-lane road, including the current image and one or more previous images, and to determine the current lane of the vehicle in the current image of the multi-lane road on the basis of the first candidate current lane, the second candidate current lane and one or more previously determined lanes of the vehicle in the one or more previous images of the multi-lane road, which can be retrieved from the buffer 104.

FIGS. 13a-d illustrates some exemplary images of driving scenes as well as the left ID estimate and the right ID estimate.

Figure 14:
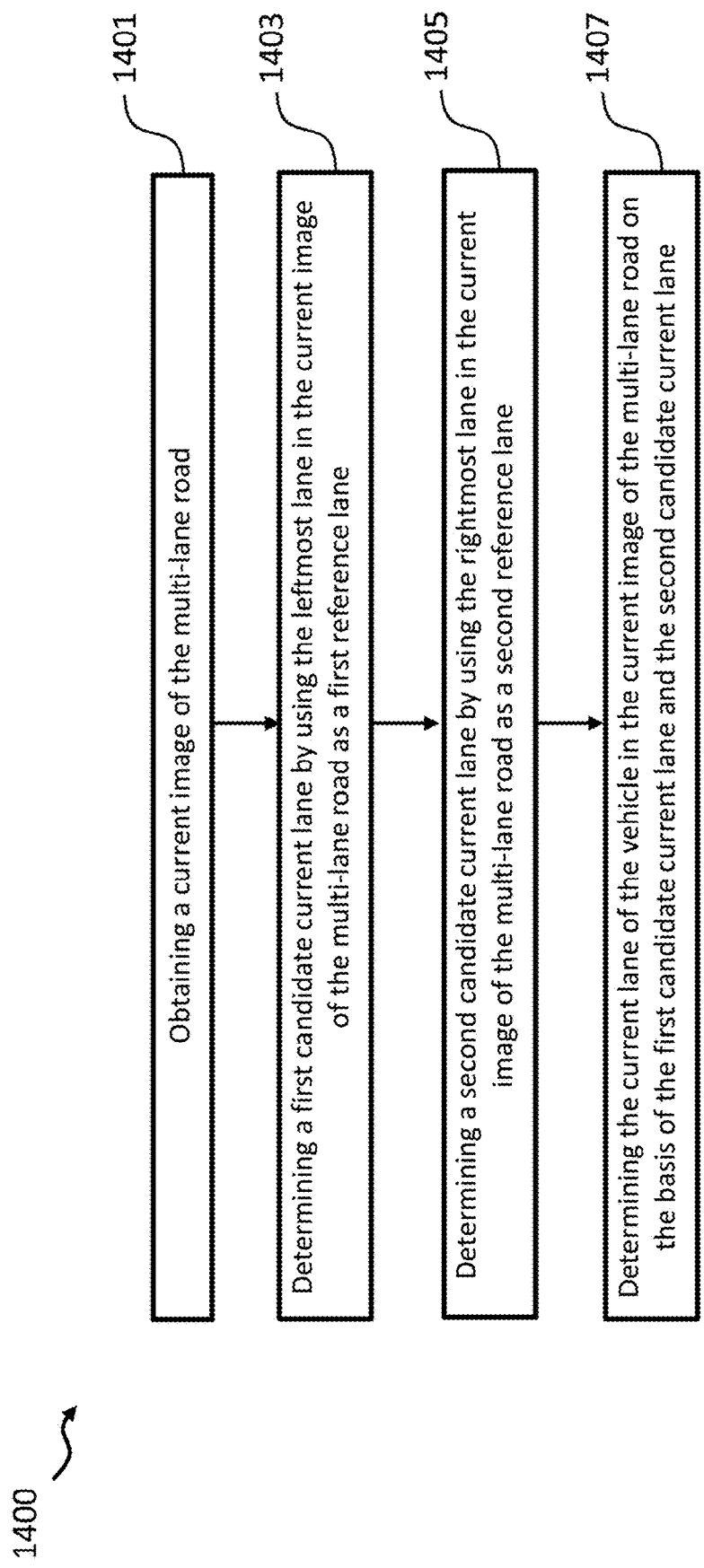
FIG. 14 is a flow diagram illustrating a lane detection method according to an embodiment of the invention.

FIG. 14 shows a flow diagram of the steps of a lane detection method 1400, which can be performed by the lane detection system 100. The lane detection method 1400 comprises the steps of: obtaining 1401 a current image of the multi-lane road, i.e. the driving scene; determining 1403 a first candidate current lane, i.e. a first estimate of the current lane, by using the leftmost lane in the current image of the multi-lane road as a first reference lane; determining 1405 a second candidate current lane, i.e. a second estimate of the current lane, by using the rightmost lane in the current image of the multi-lane road as a second reference lane; and determining 1407 the current lane of the vehicle in the current image of the multi-lane road on the basis of the first candidate current lane and the second candidate current lane.

Embodiments of the invention allow to estimate the total number of lanes inherent in an input texture image and the ID of the current lane the vehicle is driving on. Embodiments of the invention offer the possibility to identify the current lane and the corresponding lane count in extreme scenarios based on the information aggregated from present and past images. According to embodiment of the invention the temporal dimension inherent to the structure of the input data (continuous stream of images/video) processed by the LSTM (Long-Short Term Memory) cells of the neural network 109 can guarantee an additional source of information that helps in dealing with strong occlusions, as previous information extracted from previous images/frames in the sequence contributes to solving this problem. Due to the nature of the input signal (2D image), a variant of LSTMs called Convolutional LSTMs (convLSTM) can be used in order to enable the capturing of temporal information inherent to two-dimensional input signals such as images.

The person skilled in the art will understand that the "blocks" ("units") of the various figures (method and apparatus) represent or describe functionalities of embodiments of the invention (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the invention may be integrated into one processing unit, or each of the units may exist alone physically, or two or more units are integrated into one unit.

What is claimed is:

1. A lane detection system for a vehicle for determining a current lane of a multi-lane road which the vehicle is driving on, wherein the system comprises:
   a processor; and
   a memory coupled to the processor and having processor-executable instructions stored thereon, which are executed by the processor and cause the processor to:
      obtain a current image of the multi-lane road;
      determine a first candidate current lane by using a leftmost lane in the current image of the multi-lane road as a first reference lane;
      determine a second candidate current lane by using a rightmost lane in the current image of the multi-lane road as a second reference lane;
      determine, for the first candidate current lane, a first set of likelihood measure values, and for the second candidate current lane, a second set of likelihood measure values, wherein the first set of likelihood measure values comprises a respective likelihood measure value for each lane of the multi-lane road that the vehicle is driving on the respective lane, and wherein the second set of likelihood measure values comprises a respective likelihood measure value for each lane of the multi-lane road that the vehicle is driving on the respective lane;
      determine the first candidate current lane as the lane associated with the largest likelihood measure value of the first set of likelihood measure values;
      determine the second candidate current lane as the lane associated with the largest likelihood measure value of the second set of likelihood measure values; and
      determine either the first candidate current lane or the second candidate current lane to be the current lane of the vehicle in the current image by comparing a first difference between the largest likelihood measure value and an average likelihood measure value of the first set of likelihood measure values with a second difference between the largest likelihood measure value and an average likelihood measure value of the second set of likelihood measure values.

2. The lane detection system of claim 1, wherein the processor is further configured to determine a total number of lanes of the multi-lane road on the basis of the current image of the multi-lane road.

3. The lane detection system of claim 1, wherein the processor is configured to:
   obtain a plurality of temporally successive images of the multi-lane road, including the current image and one or more previous images, and
   determine the current lane of the vehicle in the current image of the multi-lane road on the basis of the first candidate current lane, the second candidate current lane and one or more previously determined lanes of the vehicle in the one or more previous images of the multi-lane road.

4. The lane detection system of claim 3, wherein the processor is further configured to:
   determine whether the vehicle is moving or not, and
   in response to the vehicle not moving, determine the current lane of the vehicle in the current image of the multi-lane road on the basis of one or more previously determined lanes of the vehicle in the one or more previous images.

5. The lane detection system of claim 4, wherein the processor is configured to determine whether the vehicle is moving or not on the basis of the one or more previously determined lanes of the vehicle in the one or more previous images.

6. The lane detection system of claim 1, wherein the processor is configured to implement a convolutional neural network configured to determine the first candidate current lane, the second candidate current lane, the current lane and/or the total number of lanes of the multi-lane road using one or more convolutional neural network weights.

7. The lane detection system of claim 6, wherein the convolutional neural network is configured to train the convolutional neural network weights using a cost function, wherein the cost function is based on a cross entropy loss function, wherein the cost function further depends on the distance of a lane from the leftmost lane and/or the rightmost lane in the current image of the multi-lane road and/or wherein the cost function implements a constraint that the first candidate current lane and the second candidate current lane are related to the total number of lanes of the multi-lane road.

8. The lane detection system of claim 6, wherein the processor is further configured to implement a semantic segmentation network, wherein the semantic segmentation network is configured to semantically segment the current image of the multi-lane road, and wherein the processor is configured to determine the current lane of the vehicle in the current image of the multi-lane road on the basis of the first candidate current lane, the second candidate current lane and the semantically segmented current image.

9. The lane detection system of claim 1, wherein the processor is further configured to generate a first confidence value for the first candidate current lane and a second confidence value for the second candidate current lane.

10. The lane detection system of claim 1, wherein the processor is configured to:
flip the current image of the multi-lane road along a vertical axis to obtain a flipped image of the multi-lane road;
determine a third candidate current lane by using the leftmost lane in the flipped image of the multi-lane road as the first reference lane;
determine a fourth candidate current lane by using the rightmost lane in the flipped image of the multi-lane road as the second reference lane; and
determine the current lane of the vehicle on the basis of the first candidate current lane and the second candidate current lane and the constraint that the first candidate current lane is equal to the fourth candidate current lane and the second candidate current lane is equal to the third candidate current lane.

11. The lane detection system of claim 1, wherein the processor is configured to:
obtain a plurality of temporally successive images of the multi-lane road, including the current image, and
adjust the brightness of the current image on the basis of an average brightness of the plurality of temporally successive images of the multi-lane road.

12. The lane detection system of claim 1, further comprising a camera configured to capture the current image of the multi-lane road.

13. The lane detection system of claim 1, wherein the processor is configured to:
based on that the first difference is greater than the second difference, determine the first candidate current lane to be the current lane of the vehicle; or
based on that the second difference is greater than the second difference, determine the second candidate current lane to be the current lane of the vehicle.

14. A vehicle comprising a lane detection system, wherein the system comprises:
a processor; and
a memory coupled to the processor and having processor-executable instructions stored thereon, which are executed by the processor and cause the processor to:
obtain a current image of the multi-lane road;
determine a first candidate current lane by using the leftmost lane in the current image of the multi-lane road as a first reference lane;
determine a second candidate current lane by using the rightmost lane in the current image of the multi-lane road as a second reference lane;
determine, for the first candidate current lane, a first set of likelihood measure values, and for the second candidate current lane, a second set of likelihood measure values, wherein the first set of likelihood measure values comprises a respective likelihood measure value for each lane of the multi-lane road that the vehicle is driving on the respective lane, and wherein the second set of likelihood measure values comprises a respective likelihood measure value for each lane of the multi-lane road that the vehicle is driving on the respective lane;
determine the first candidate current lane as the lane associated with the largest likelihood measure value of the first set of likelihood measure values;
determine the second candidate current lane as the lane associated with the largest likelihood measure value of the second set of likelihood measure values; and
determine either the first candidate current lane or the second candidate current lane to be the current lane of the vehicle in the current image by comparing a first difference between the largest likelihood measure value and an average likelihood measure value of the first set of likelihood measure values with a second difference between the largest likelihood measure value and an average likelihood measure value of the second set of likelihood measure values.

15. The vehicle of claim 14, wherein the processor is further configured to determine a total number of lanes of the multi-lane road on the basis of the current image of the multi-lane road.

16. The vehicle of claim 14, wherein the processor is configured to:
flip the current image of the multi-lane road along a vertical axis to obtain a flipped image of the multi-lane road;
determine a third candidate current lane by using the leftmost lane in the flipped image of the multi-lane road as the first reference lane;
determine a fourth candidate current lane by using the rightmost lane in the flipped image of the multi-lane road as the second reference lane; and
determine the current lane of the vehicle on the basis of the first candidate current lane and the second candidate current lane and the constraint that the first candidate current lane is equal to the fourth candidate current lane and the second candidate current lane is equal to the third candidate current lane.

17. The vehicle of claim 14, wherein the processor is configured to:
- based on that the first difference is greater than the second difference, determine the first candidate current lane to be the current lane of the vehicle; or
- based on that the second difference is greater than the second difference, determine the second candidate current lane to be the current lane of the vehicle.

18. A method of determining a current lane of a multi-lane road a vehicle is driving on, wherein the method is applied to a lane detection system and comprises:
- obtaining a current image of the multi-lane road;
- determining a first candidate current lane by using the leftmost lane in the current image of the multi-lane road as a first reference lane;
- determining a second candidate current lane by using the rightmost lane in the current image of the multi-lane road as a second reference lane;
- determining, for the first candidate current lane, a first set of likelihood measure values, and for the second candidate current lane, a second set of likelihood measure values, wherein the first set of likelihood measure values comprises a respective likelihood measure value for each lane of the multi-lane road that the vehicle is driving on the respective lane, and wherein the second set of likelihood measure values comprises a respective likelihood measure value for each lane of the multi-lane road that the vehicle is driving on the respective lane;
- determining the first candidate current lane as the lane associated with the largest likelihood measure value of the first set of likelihood measure values;
- determining the second candidate current lane as the lane associated with the largest likelihood measure value of the second set of likelihood measure values; and
- determining either the first candidate current lane or the second candidate current lane to be the current lane of the vehicle in the current image by comparing a first difference between the largest likelihood measure value and an average likelihood measure value of the first set of likelihood measure values with a second difference between the largest likelihood measure value and an average likelihood measure value of the second set of likelihood measure values.

19. The method of claim 18, further comprising:
determining a total number of lanes of the multi-lane road on the basis of the current image of the multi-lane road.

20. The method of claim 18, further comprising:
- based on that the first difference is greater than the second difference, determining the first candidate current lane to be the current lane of the vehicle; or
- based on that the second difference is greater than the second difference, determining the second candidate current lane to be the current lane of the vehicle.

* * * * *